G. W. SANDERS.
SCOOP BOARD AND END GATE.
APPLICATION FILED JAN. 31, 1921.
1,395,300.
Patented Nov. 1, 1921.
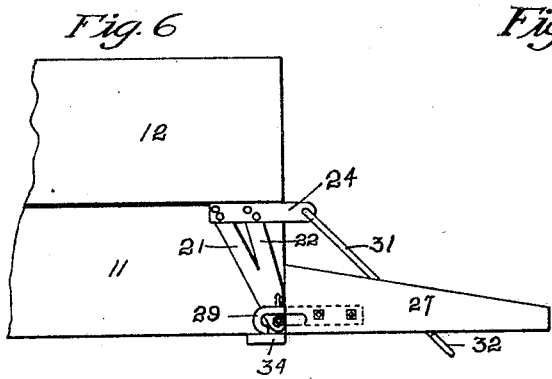
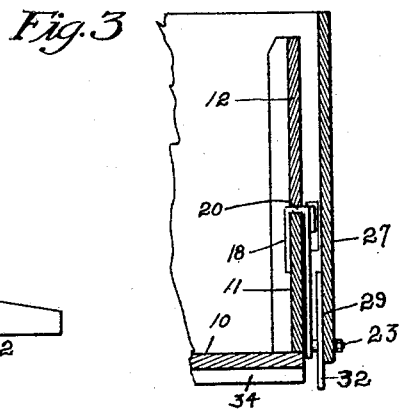
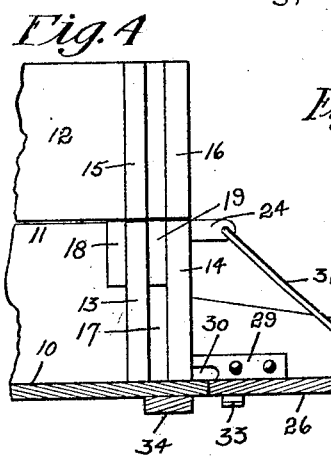
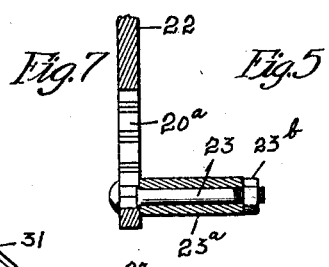
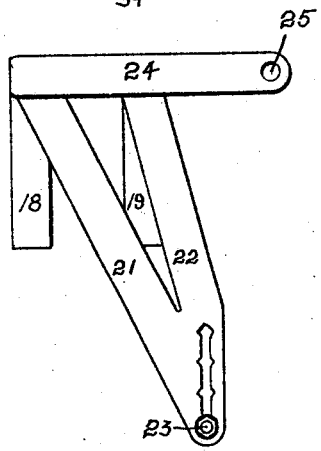
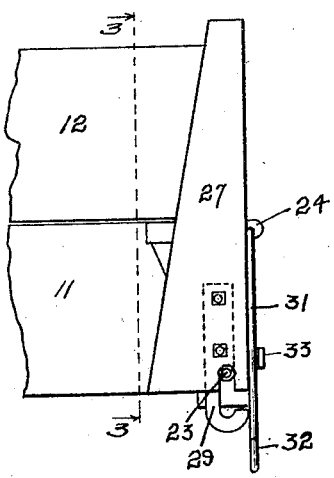
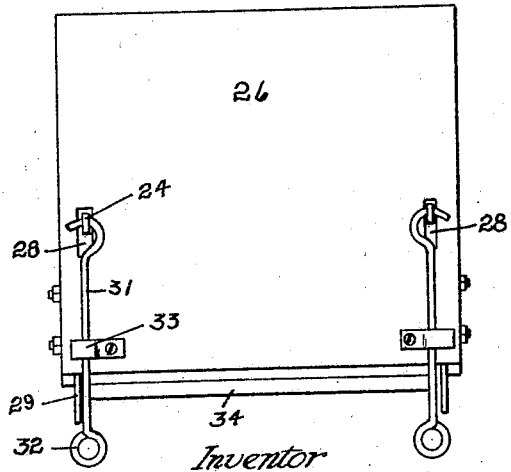
Witness
Lynn Latta
Inventor
George W. Sanders
By Bair & Freeman Attorneys

UNITED STATES PATENT OFFICE.

GEORGE W. SANDERS, OF TOWNSHIP 66, WORTH COUNTY, MISSOURI.

SCOOP-BOARD AND END-GATE.

1,395,300.   Specification of Letters Patent.   Patented Nov. 1, 1921.

Application filed January 31, 1921. Serial No. 441,401.

*To all whom it may concern:*

Be it known that I, GEORGE W. SANDERS, a citizen of the United States, and a resident of Township 66, in the county of Worth and State of Missouri, have invented a certain new and useful Scoop-Board and End-Gate, of which the following is a specification.

The object of my invention is to provide a scoop board and end gate structure of simple, durable and inexpensive construction.

A further object is to provide such a structure, comprising members adapted to be connected with a scoop board and end gate and to be mounted on a wagon box, which members can be sold as shelf goods or can be sold in connection with the scoop board and end gate.

A further object is to provide such a structure so made that the end gate can be readily and easily connected with the other parts of the structure, and the whole may be mounted on the wagon box without the use of bolts or screws or rods or the like.

With these and other objects in view, my invention consists in the construction, arrangement and combination of the various parts of my device, whereby the objects contemplated are attained, as hereinafter more fully set forth, pointed out in my claims, and illustrated in the accompanying drawings, in which:

Figure 1 shows a rear elevation of a scoop board and end gate structure, embodying my invention.

Fig. 2 shows a side elevation of the same installed on a wagon box.

Fig. 3 shows a detailed, sectional view taken on the line 3—3 of Fig. 2.

Fig. 4 shows a sectional view through the wagon box, illustrating the scoop board and end gate in its lowered position.

Fig. 5 shows a detailed view of one of the supporting mountings or brackets.

Fig. 6 shows a side elevation of a portion of the wagon with the scoop board in lowered position; and Fig. 7 shows a detail, sectional view of part of the mounting.

In the accompanying drawings, I have shown my scoop board and end gate structure in connection with a wagon box and end gate and scoop board.

In the drawings herewith, I have used the reference numeral 10 to indicate generally the bottom of the wagon box, having the sides 11 and the side boards 12. At the rear ends of the sides and side boards are the spaced cleats 13, 14, 15 and 16, arranged as usual and leaving the slot or groove or guideway 17 for the ordinary end gate.

My improved scoop board and end gate structure comprises a pair of detachable supporting brackets. Each of these brackets consist of two upright members 18 and 19 designed to rest on the inside of the wagon box, as shown in Fig. 4, with the member 19 received in the guideway 17. At their upper ends, the members 18 and 19 have portions 20 extending laterally and designed to rest on top of the sides 11.

At the outer ends of the members 20 are members 21 and 22 extending downwardly and inclined slightly rearwardly and converging as shown in Fig. 5. The lower ends of the members 21 and 22 are preferably formed integral with each other, as shown in said figure, and provided with a vertically elongated slot designed to receive the shank of a bolt 23, which extends laterally as shown. On the bolt 23 with one end bearing against the member 22 is a sleeve 23ª held in place by a nut 23ᵇ. The brackets just described are made in pairs, one for the right side and one for the left side of the wagon box.

Connected with the upper ends of the members 20 and 21 of each bracket is a bar or strip 24, which projects rearwardly beyond the member 22, as shown in Figs. 2, 4, and 5. The strip 24 has at its rear end a hole 25.

The strip projects rearwardly beyond the end of the wagon box, as clearly shown in Fig. 4.

The brackets are designed to be used in connection with a scoop board and end gate member, comprising the end gate and the scoop board member 26 and the side wings 27. The scoop board 26 has the holes 28, through which the strips 24 may be inserted.

Secured to the lower inner part of each side wing 27 as shown in Fig. 3 is a strip or bar 29, which projects below the side wing, as shown in Fig. 2, and has a longitudinally elongated slot 30. The side wings have registering slots.

In assembling the brackets with the end gate and scoop board, each bracket is placed in position with its bolt 23 projected through the slot 30.

The entire device is then slid down from above with the members 18 and 19 in their proper positions. Pivotally connected with the members 24 at the holes 25 are rods 31, having handles or rings 32 at their outer ends.

On the lower part of the end gate 26 are spring clips 33 shown in Fig. 1 for detachably engaging the rods 31, for holding the end gate locked in its upright position.

Below the bottom 10 at the rear end thereof is a cross piece 34.

When it is desired to lower the scoop board for use, the rods 31 are released from the spring clips 33, and thereupon the end gate and scoop board may be swung rearwardly and downwardly to the position shown in Fig. 4.

The rings 32 support the outer end of the scoop board.

When the scoop board is in its upright position, the bolts 23 are in the upper ends of the slots 30, and as the scoop board is swung downwardly and rearwardly, the pins move to the other ends of said slots.

Attention is called to the cheapness and simplicity of my device.

The bolts 23 may be adjusted to different positions in the slots 20ᵃ for adjusting my device to different wagon boxes.

Attention is also called to the fact that the brackets the rods and the strips or bars 29 may be sold as shelf goods independently of the end gate and scoop board, or the entire device may be sold in an assembled structure.

It is my desire to cover by my claims, any modified forms of structure or any changes of structure, which may be reasonably included within the scope of said claims.

I claim as my invention:

1. In an end gate structure, a bracket comprising spaced upright members, having at their upper ends lateral extensions, members connected with said extensions and extending downwardly and rearwardly therefrom, and connected at their lower ends, and having laterally projecting pins at their lower ends, bars having elongated slots for receiving said pins, strips connected with the upper ends of said rearwardly inclined members and projecting rearwardly therefrom, provided with holes at their rear ends, and rods designed to be pivotally connected with said last strips.

2. The combination of a scoop board, having side wings with bars mounted on said side wings and projecting beyond the ends thereof, said side wings and bars having registering elongated slots, a pair of brackets, each having upright members provided with lateral extensions at their upper ends, and having members inclined from said extensions downwardly and rearwardly and converging, said members, having at their lower ends detachable adjustable laterally projecting pins received in the respective slots, strips on said last-described members projecting rearwardly therefrom, said end gate member having holes for receiving the ends of said last-named strips, and rods pivotally connected with said last-named strips at their rear ends and clips on said end gate member.

Des Moines, Iowa, January 15, 1921.

GEORGE W. SANDERS.